E. WIRTH AND C. A. DEMMLER.
UNION BOTTOM FINISHING MACHINE.
APPLICATION FILED FEB. 24, 1917.

1,330,508.

Patented Feb. 10, 1920.
12 SHEETS—SHEET 4.

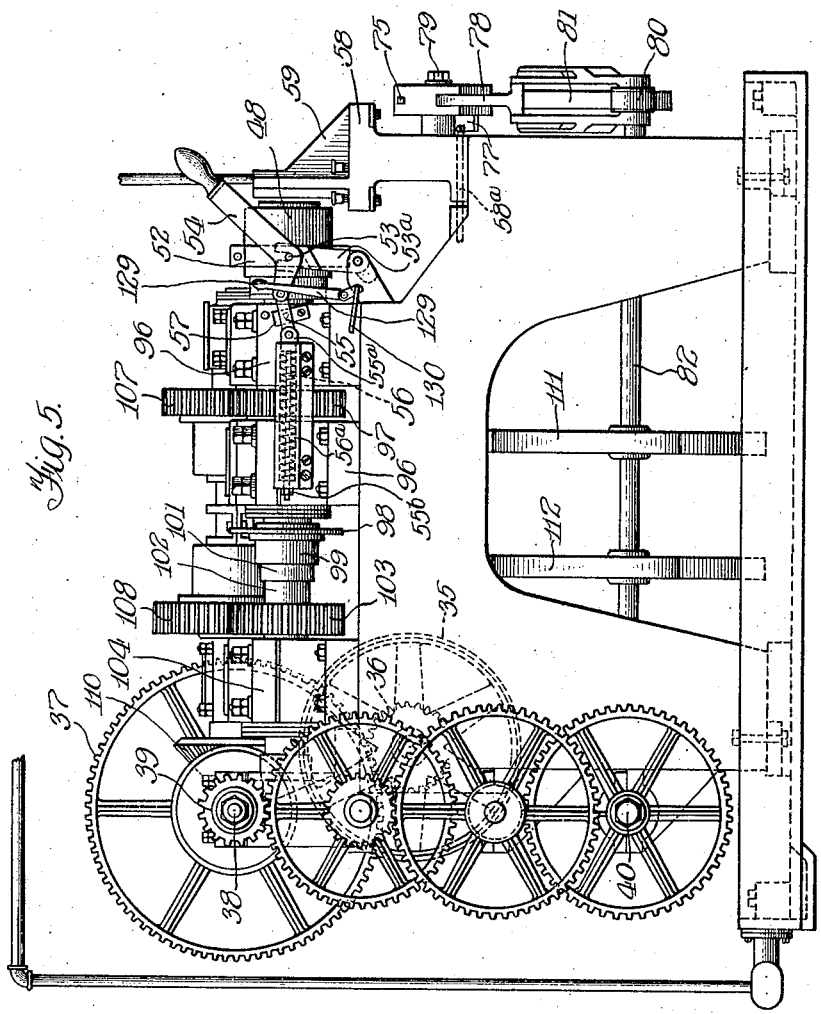

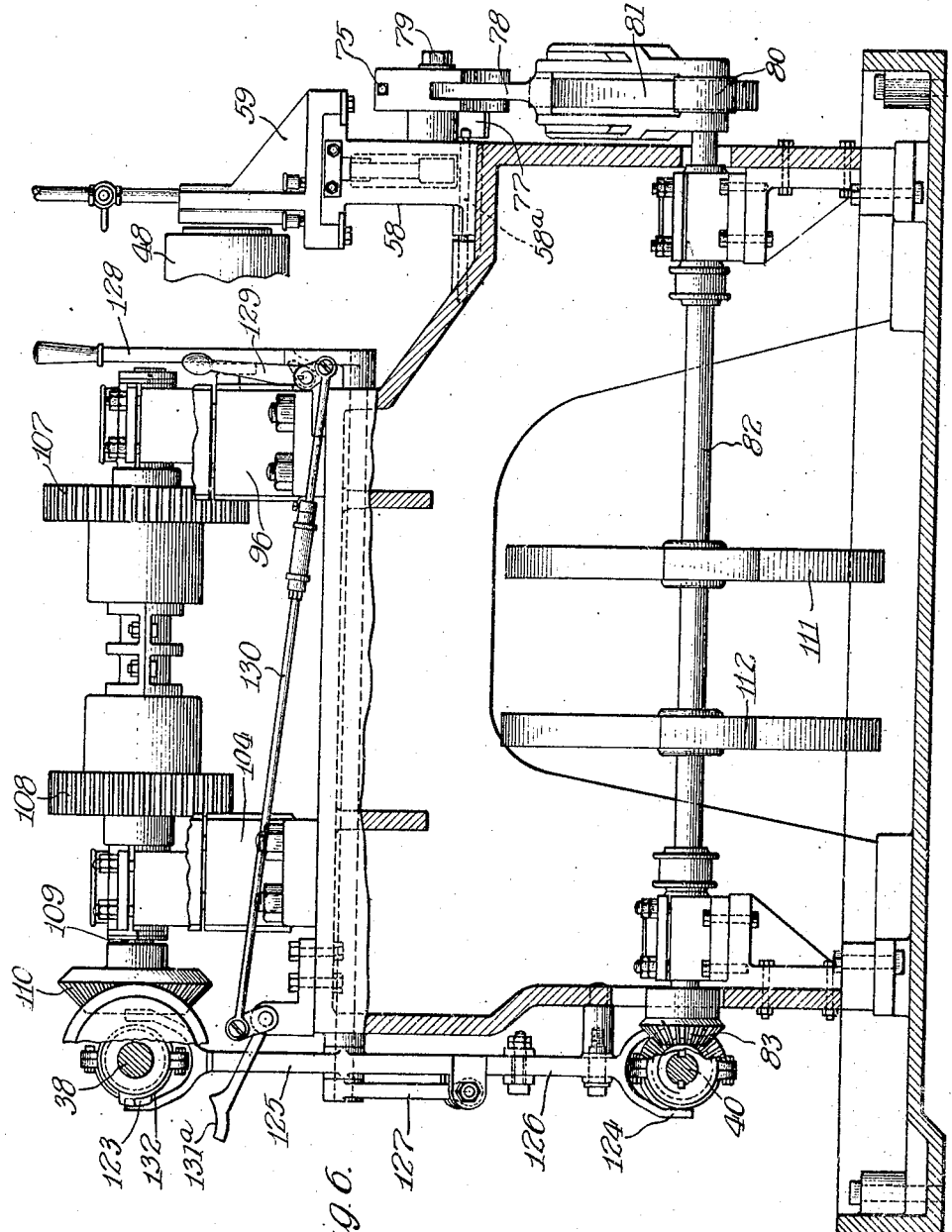

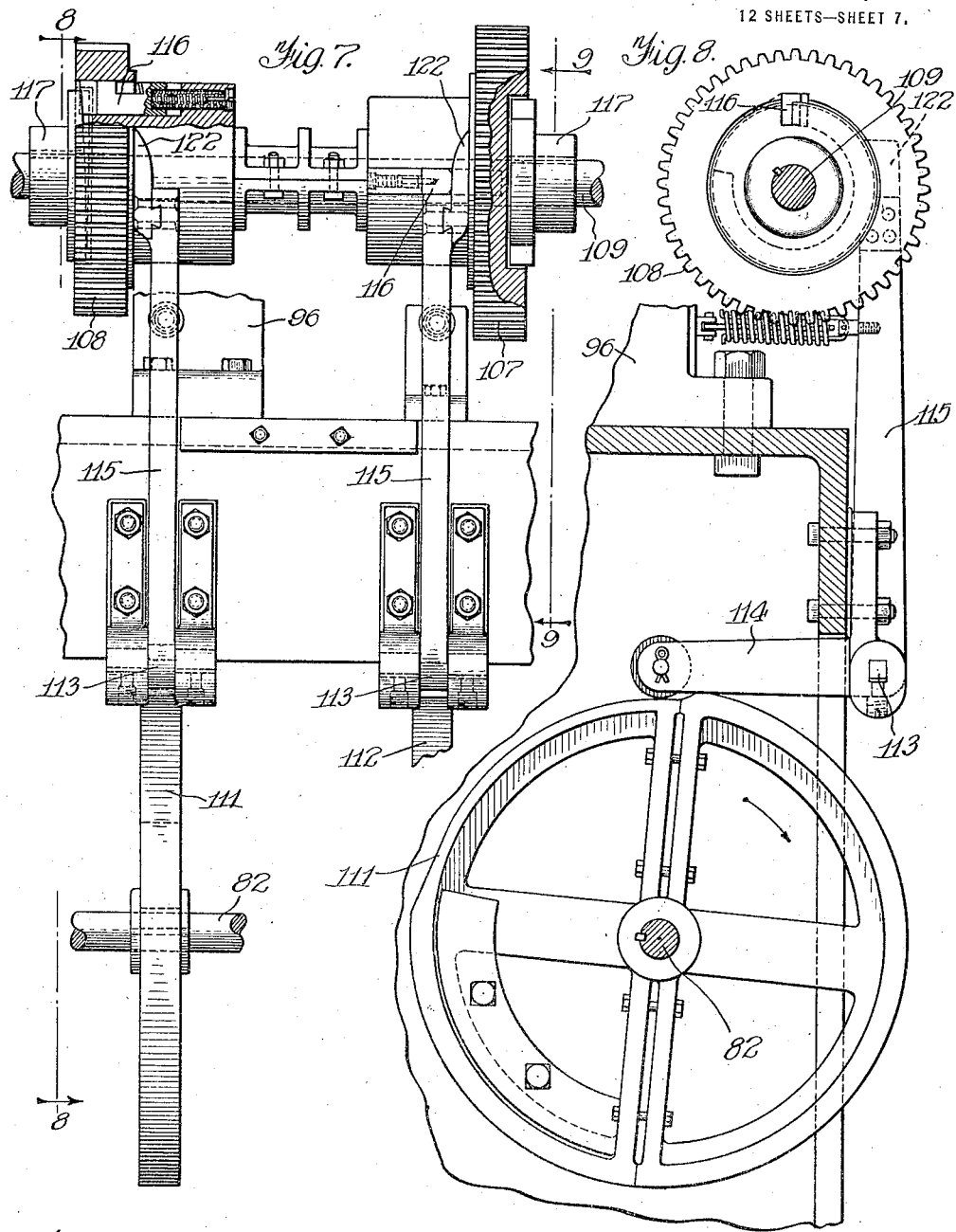

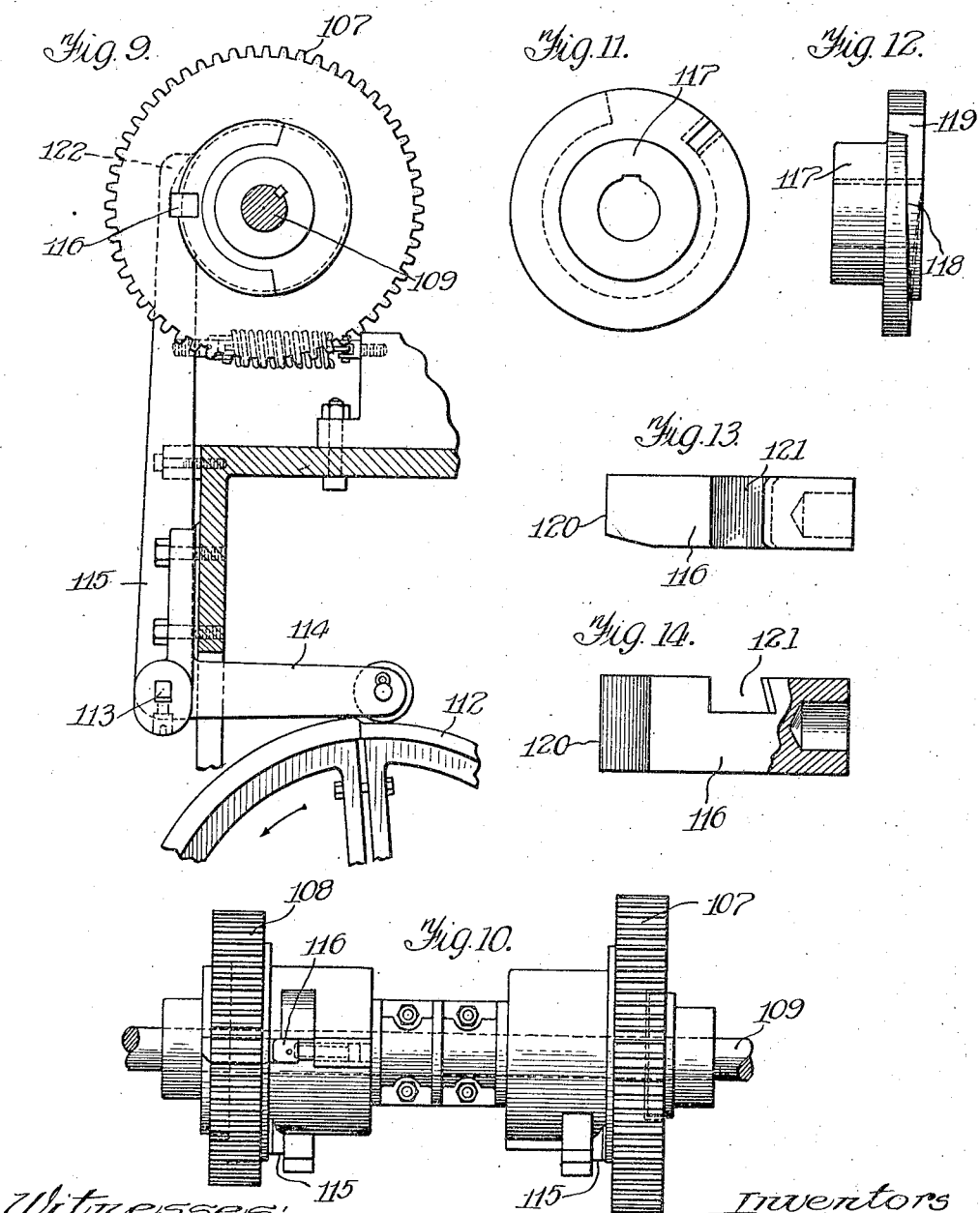

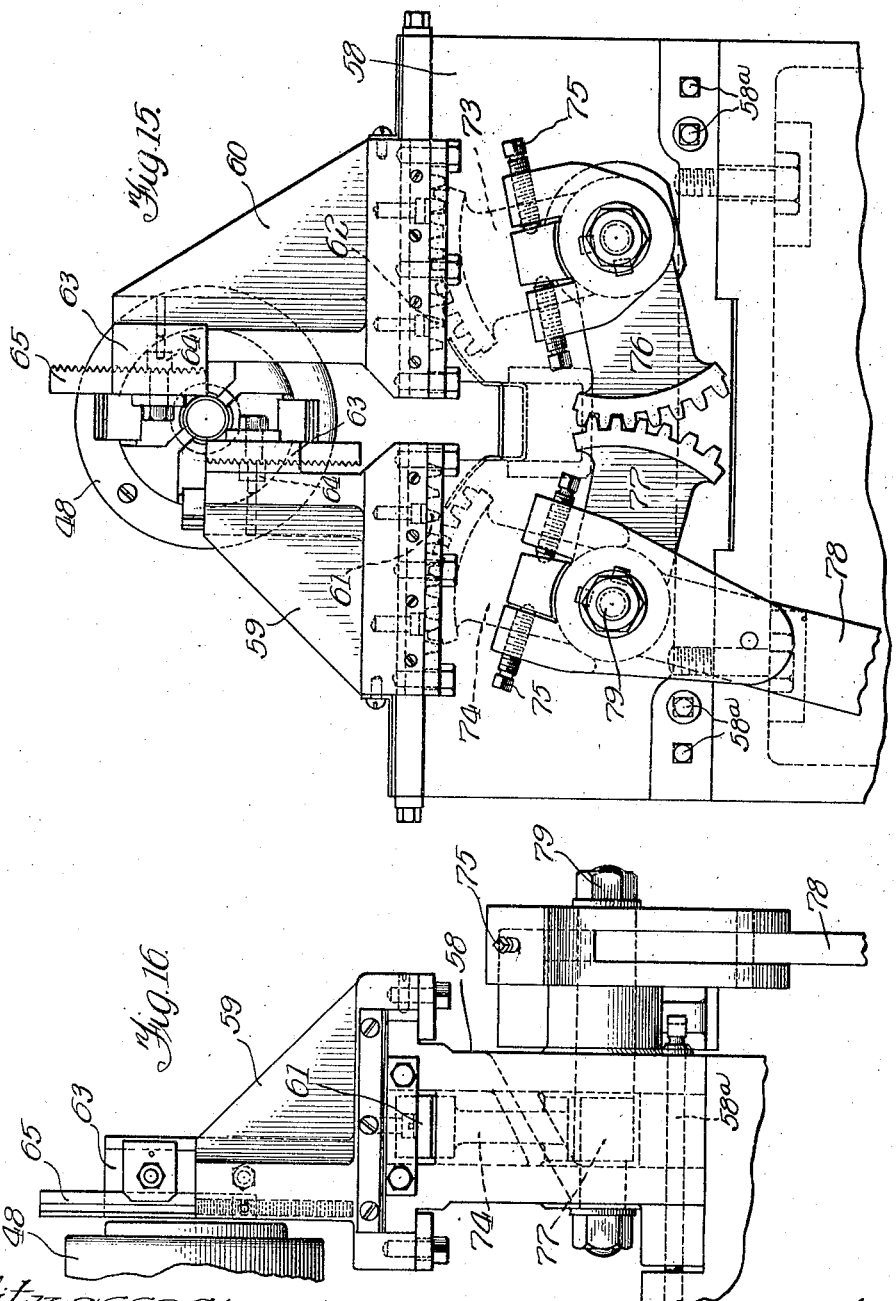

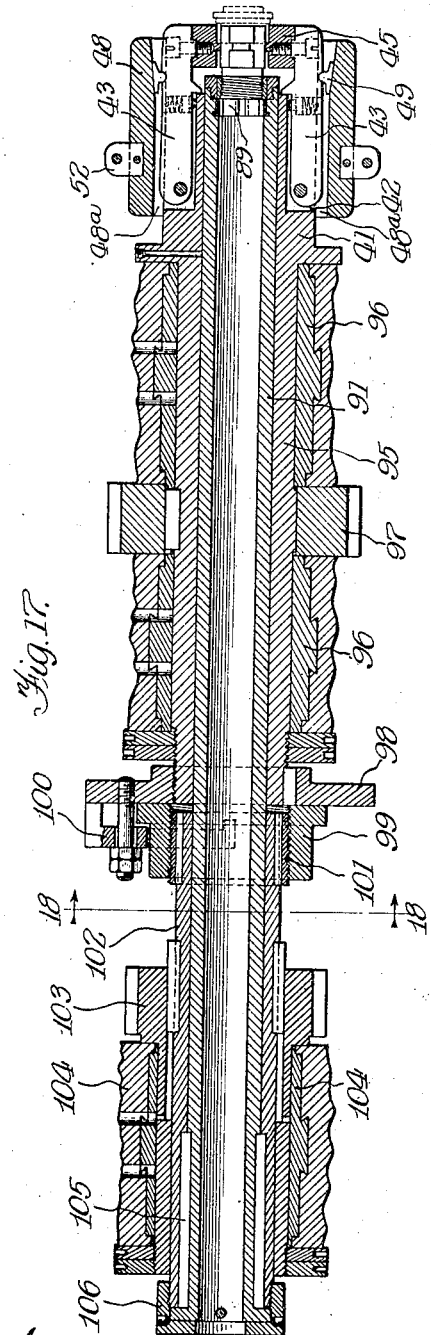

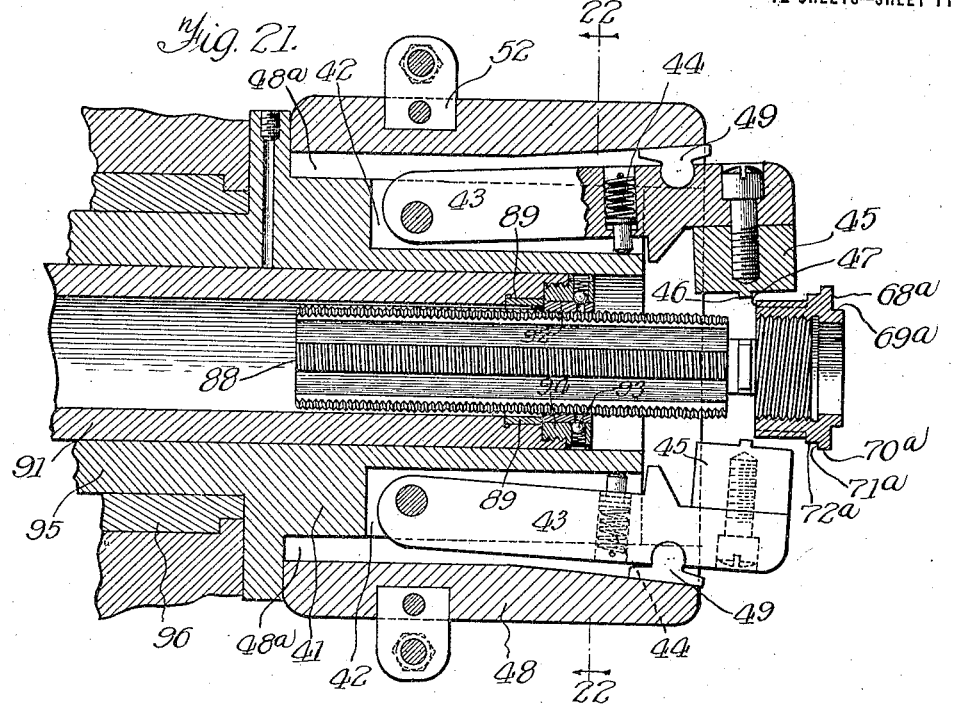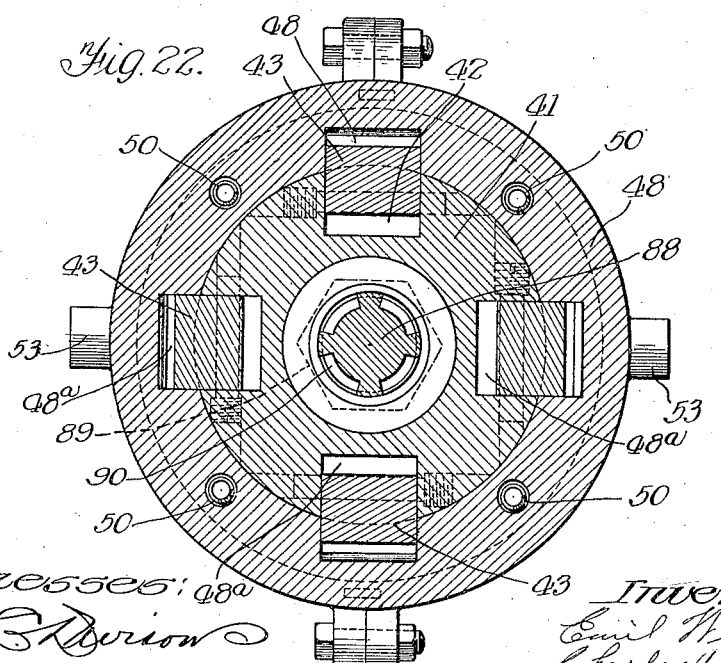

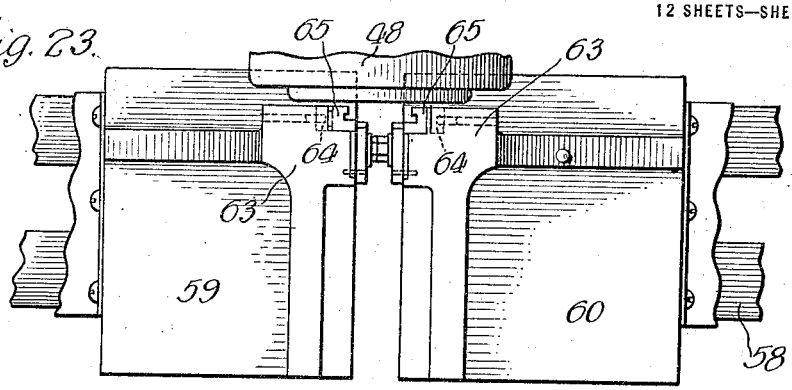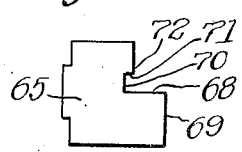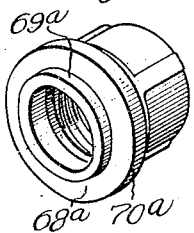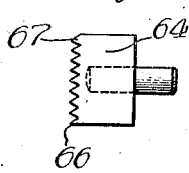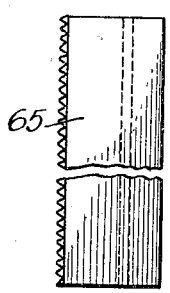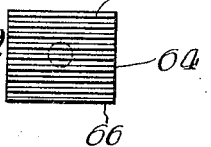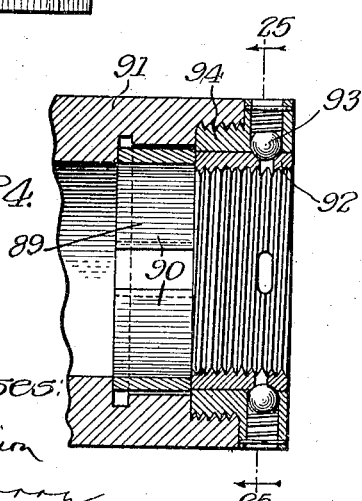

UNITED STATES PATENT OFFICE.

EMIL WIRTH AND CHARLES A. DEMMLER, OF KEWANEE, ILLINOIS, ASSIGNORS, BY MESNE ASSIGNMENTS, TO WALWORTH MANUFACTURING COMPANY, A CORPORATION OF MASSACHUSETTS.

UNION-BOTTOM-FINISHING MACHINE.

1,330,508.  Specification of Letters Patent.  Patented Feb. 10, 1920.

Application filed February 24, 1917. Serial No. 150,697.

*To all whom it may concern:*

Be it known that we, EMIL WIRTH and CHARLES A. DEMMLER, citizens of the United States, and residents of Kewanee, in the county of Henry and State of Illinois, have invented certain new and useful Improvements in Union-Bottom-Finishing Machines, of which the following is a specification.

Our invention relates to means for finishing pipe fittings and has particular reference to a novel machine adapted to finish a shoulder on one portion of a pipe union and to thread the same.

To finish a union bottom it is necessary that one end of the same be threaded, and that a shoulder and seat be machined on its opposite end. This seat coöperates with the seat of the interfitting portion of the union and the shoulder engages an inwardly extending flange of the threaded ring that holds the interfitting portions of the complete union in their proper relative positions. On account of the inter-relation of these parts, it is necessary that they be machined with great accuracy. Furthermore, in view of the relatively low price at which these fittings must be sold, the work must be done economically. It has heretofore been the practice to finish fittings such as herein referred to in two or more operations. In the machine which we have devised and here disclosed, the several finishing operations heretofore required in a fitting of this sort are completed simultaneously; that is, in one operation.

As a further economic advantage, we have obviated the necessity for reversing the tap or chuck to withdraw the tap from the work. The desired result is accomplished by rotating both the tap and the chuck in the same direction, the former at a higher speed than the latter, which carries the work. When the tapping operation is complete, the rotation of the tap is stopped, the work continuing its rotation. In that manner the work is turned off the tap.

The finishing operation which serves to form the inner or shoulder end of the article is performed by stationary tools having motion only in a plane normal to the axis of rotation of the work, but whose position is adjustable in a direction parallel to the axis of rotation of the work.

Fundamentally the machine comprises means for removably engaging a fitting, means for rotating the work-holding means, a tap, means for rotating said tap in a direction corresponding to the rotation of said work but at a higher speed, means operative simultaneously with the threading operation for finishing the shouldered end of the fitting and means for automatically stopping the rotation of said tap, whereby the work is backed off from said tap. The details of the machines such as described will be better understood in connection with the drawings and the accompanying description.

In the drawings:

Fig. 5 is a view of the left side of the machine as viewed in Fig. 2;

Fig. 6 is a partial sectional view on the line 6—6 of Fig. 2;

Fig. 7 is an enlarged fragmentary detail of the clutch and clutch-operating mechanism;

Fig. 8 is a side elevation of the same, partly in section, on the line 8—8 of Fig. 7;

Fig. 9 is a view similar to Fig. 8, except that it is taken from the opposite side of Fig. 7, the section being on the line 9—9 of Fig. 7;

Fig. 10 is a plan view showing portions of the construction shown in Figs. 7 to 9 inclusive;

Figs. 11 and 12 are face and edge views respectively of the clutch-operating disk;

Figs. 13 and 14 are plan views and elevations respectively of the clutch pin;

Fig. 15 is an enlarged front elevation of the tool post blocks and the operating means therefor;

Fig. 16 is a side elevation thereof;

Fig. 17 is an enlarged fragmentary vertical section through the tap and chuck spindles and the operating devices therefor;

Fig. 18 is a sectional view on the line 18—18 of Fig. 17;

Fig. 19 is an end view of the chuck;

Fig. 20 is a sectional view on the line 20—20 of Fig. 19;

Fig. 21 is an enlarged detail of the chuck and tap holding devices, a union bottom being shown in section after it has been completed;

Fig. 22 is a sectional view on the line 22—22 of Fig. 21;

Fig. 23 is a plan view of the tool post blocks shown in Figs. 15 and 16;

Fig. 24 is an enlarged sectional view showing the tap-holding means;

Fig. 25 is a sectional view on the line 25—25 of Fig. 24;

Figs. 26 and 27 are side and end views respectively of the finishing tool employed for forming the flanged end and seat of the fitting;

Figs. 28 and 29 are end and face views respectively of the coöperating adjustment block by means of which the tool shown in Figs. 26 and 27 is adjusted and secured, and Fig. 30 is a perspective view of the union part on which the present machine is intended to operate.

Figure 1:
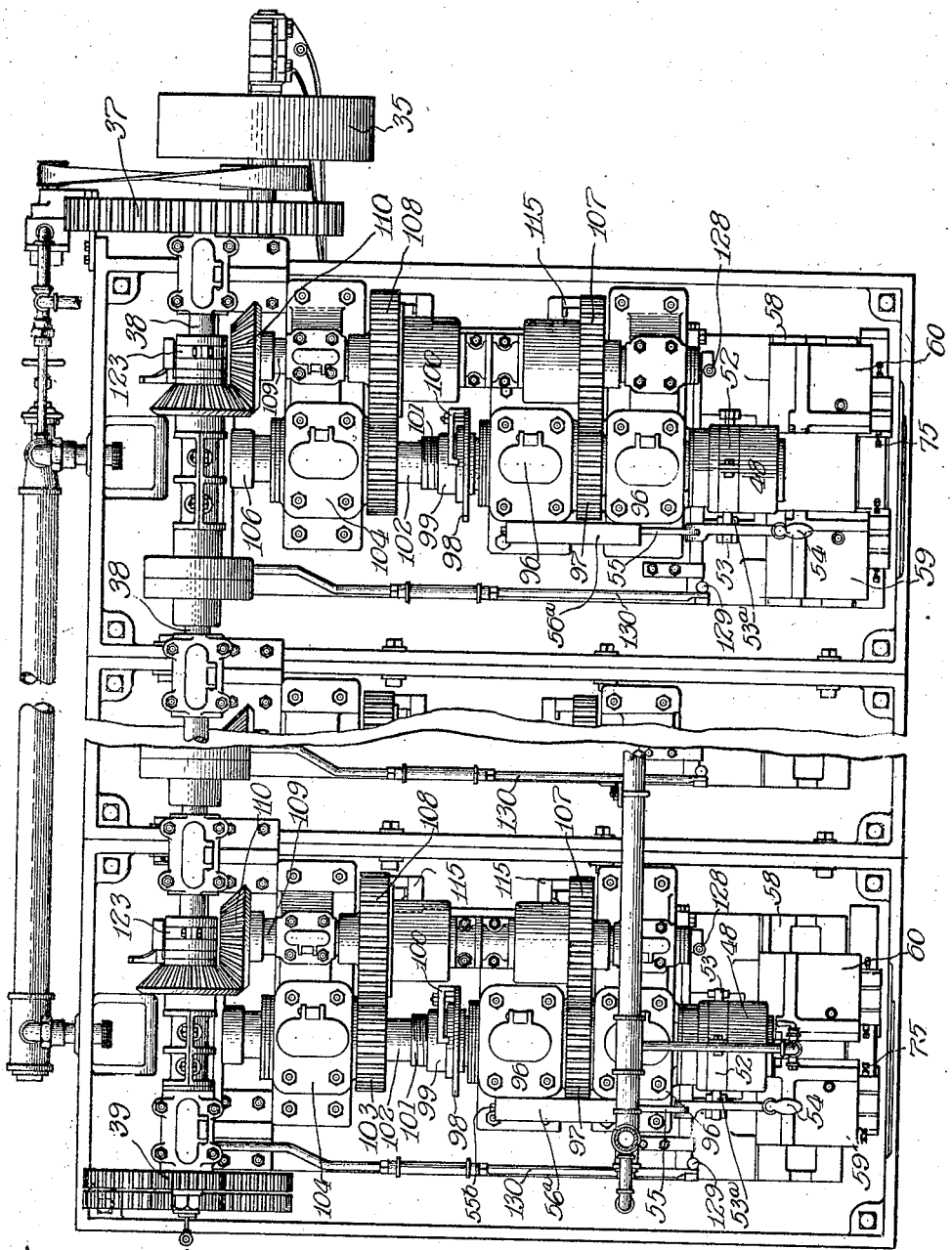
Figure 1 is a plan view of the two units of a machine such as contemplated by us.

In the drawings, it will be seen that in suitable bearings in the frame is mounted a drive pulley 35, which may be connected by a belt to a prime mover. Through a pinion 36 and gear 37 motion is transmitted to the main shaft 38. This shaft provides power for all of the units. While we have shown but two of such units, a satisfactory installation includes four thereof. This is substantially the maximum number which may be under the charge of one operator or workman.

Figure 2:
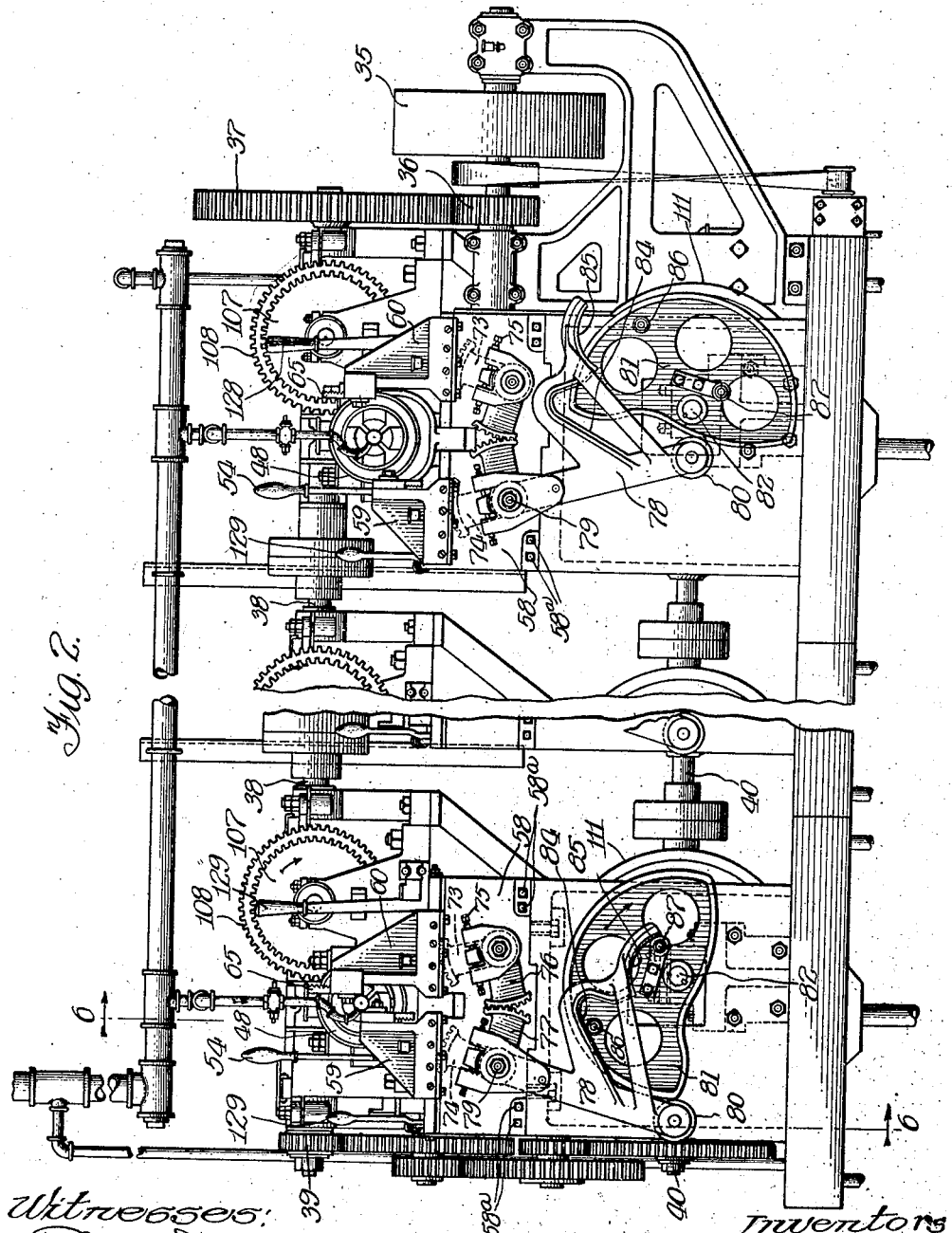
Fig. 2 is a front elevation of the same two units.

The main shaft extends from side to side of the machine and terminates in a pinion 39 on the overhung end of the shaft. By means of the train of reducing gears shown in edge view in Fig. 2 and in side elevation in Fig. 5, motion is imparted to the cam shaft 40, which likewise extends from side to side of the machine.

Inasmuch as each of the units is a duplicate of the other, we will describe but one thereof.

*The work-holding chuck.*—The means employed for holding the work, which in this instance is the union bottom, is best shown in Figs. 2, 17, 19, 20, 21 and 22. Pivoted to a head 41 and mounted for angular movement in suitable longitudinal slots 42 therein are clamping jaws 43. The springs 44 tend to hold the jaws in expanded position. The work-engaging block 45, which is secured to the outer end of each jaw 43, is provided with a rib or shoulder 46, which acts as a stop to engage the portion of the union which we have marked 47 to accurately locate the same axially in the chuck. As a means for causing the clamping or gripping action of the jaws 43, we provide the cylinder or sleeve 48, which slidably engages the exterior of the head 41 and which is provided with longitudinal slots 48ª registering with slots 42 in head 41. The bottoms of these slots at their outer ends are inclined or flared with respect to the axis of the sleeve. Shoes or contact pieces 49, carried by the jaws 43, engage these slots, and as the sleeve is moved outwardly relative to the jaws the jaws are moved toward each other. Both the head 41 and the sleeve 48 are rotatable in unison, although relatively longitudinally movable. Spring means are provided which tend to maintain the sleeve 48 in its outer position; that is, the position in which the jaws are contracted. The springs 50 and plungers 51, shown in Fig. 20, act to secure this result, while as an additional means we provide the mechanism shown in Fig. 5. It will be seen that a band or yoke 52 encircles the sleeve 48, and that the trunnions 53 on the band are engaged by a yoke 53ª, operated by the chuck lever 54. A link 55 connects one end of the lever to an expansion spring 56. A stop 57 tends to maintain the link 55 in proper position. The clevis 55ª (Fig. 5), to which link 55 is attached, abuts against the end of the spring 56 and acts to hold it within the cylindrically recessed bracket 56ª. This clevis is in turn held in position in the recess by a threaded nut on the elongated stem of the clevis. When the lever 54 is actuated, the toggle formed by the end of the lever and the link 55 tends to compress the spring 56, and the opposing reaction of the spring, acting through the toggle upon the yoke 53ª and band 52, forces the sleeve outwardly, causing the blocks 45 to clamp the work. To release the work after the finishing operation is completed, the lever 54 is moved in the opposite direction, breaking the toggle, and since the clevis is limited in its movement outwardly, the sleeve 48 is drawn inwardly, allowing the jaws 43 to be spread apart by the springs 44. The device here described is also useful as a means whereby fittings of the same nominal size but subject to the slight variations in dimensions incident to the process of manufacture, may be tightly gripped by the work engaging jaws 45, without voluntary adjustment by the operator. It will be noted that the work-holding devices are not automatic in character, the work being clamped and released solely at the will of the operator.

*The flange and seat-forming mechanism.*—As a means for machining and finishing the exterior surface of one end of the union bottom we provide the devices best shown in Figs. 15, 16, 23 and 26 to 29 inclusive. In Figs. 15 and 16 it will be seen that on a base 58 we mount for parallel sliding movement a pair of tool post blocks 59, 60, each of which is provided on its under surface with a rack 61, 62. In the tool post face 63 we mount, in a suitable space, the block 64, best shown in Figs. 28 and 29. The tool 65, best shown in Figs. 26 and 27, is provided with a serrated edge which engages the correspondingly serrated edge of the block 64. As a means for providing for exact adjustment, even to the extent of one-half of a notch, we provide the block 64 with such number of notches or teeth as will necessitate one-half of a notch at one edge and a full notch at the other edge. In Fig. 28 the half notch is indicated at 66, and the full thread or notch at 67. By reversing the block in its opening, an adjustment of the tool to one-half the width of a thread or notch is provided. It will be noted that each of the posts is provided with one of the tools described, the cutting edge of the tool being located in a line parallel to the transverse axis of the work. The cutting edge of the tool is shaped as shown in Fig. 27. The edge 68 of the tool finishes the seat. The edge 69 outlines or finishes the spud. The edges 70, 71, serve to outline and finish the flange or shoulders, while the edge 72 defines the size of the fitting at the base of the shoulder. In order that the action of the tool on the fitting may be better understood, we have applied the numerals 68 to 72 inclusive to the fitting shown in section in Fig. 21 and have added the letter "a" to each of those numerals, it being understood that the surfaces which are marked $68^a$ to $72^a$ inclusive are surfaces which are finished by the edges which are marked 68 to 72 inclusive in Fig. 27.

As a means for causing proper and synchronous movement of the tool post blocks, we provide the segments 73, 74, which engage the racks 61, 62, these segments being adjustably connected by means of the adjusting bolts 75 to segments 76, 77, respectively. The last two segments engage for unitary motion and are caused to operate by the arm 78, best shown in Fig. 2, which is fastened to the segment 77 at 79. The end of the arm carries an anti-friction roll 80, which engages a cam 81, which is mounted on a transverse cam shaft 82. This cam shaft engages the main cam shaft 40 through the beveled gears 83, best shown in Fig. 6. Also formed as a projection from the arm 78 are cam surfaces 84, 85, which engage with the pins 86, 87, on the cam 81. By reason of the arrangement shown, the tool post blocks are positively moved in each direction; that is, toward and from each other and furthermore, this motion over a part of the travel of the tool post blocks in each direction is very rapid, in order that the tool post blocks may be withdrawn sufficiently to permit of easily replacing the finished bottom with an unfinished one while utilizing a maximum proportion of the cycle of the machine for the necessary slow movement of the tools while in actual contact with the work.

Figure 4:
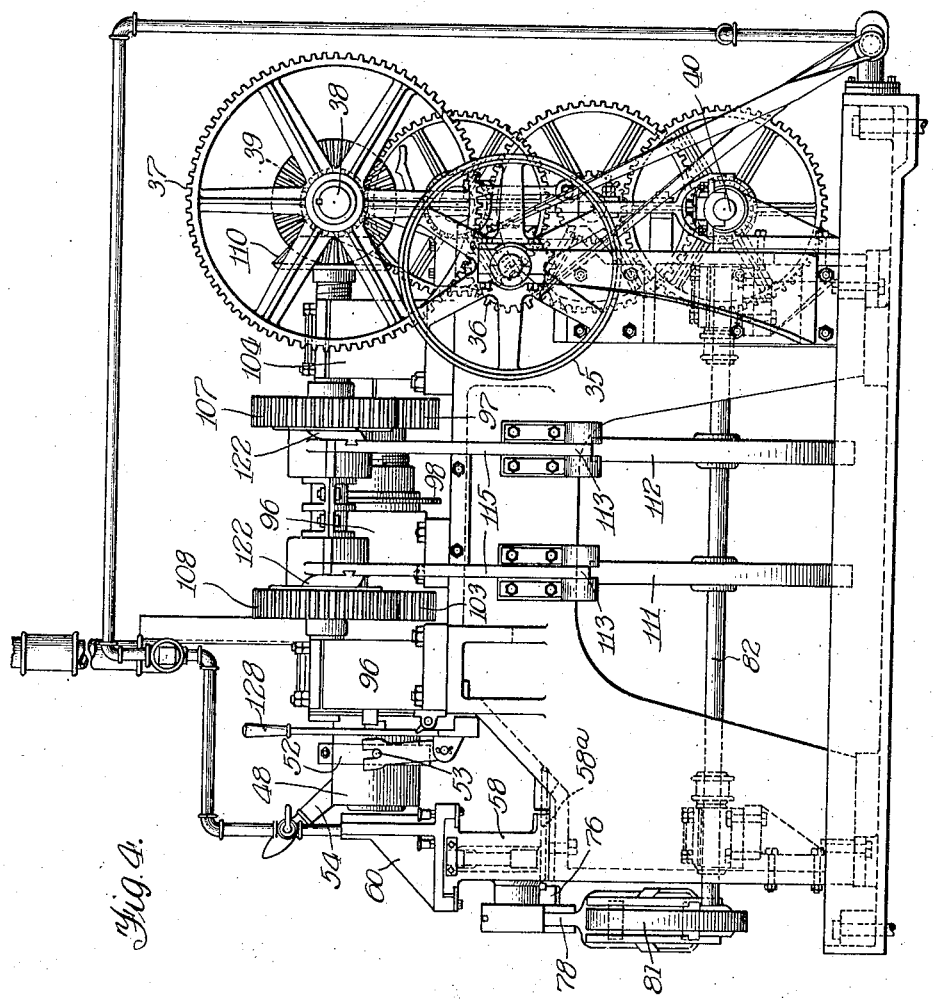
Fig. 4 is an elevation of the right side of the machine as viewed in Fig. 2.

Inasmuch as this machine is used to finish union bottoms of different sizes, it is necessary that means be provided for forming the flange or shoulder of the union bottom, at varying distances from the end surface 47 (Fig. 21), depending upon the predetermined design of the union bottom. This is accomplished by the following means: The base 58 (Figs. 2 and 4) is adjustably attached to the frame of the machine, its position and direction of movement in adjusting the base on the frame being determined by a tongue projecting from its under surface, which engages a corresponding groove in the frame of the machine. Its position relative to the frame, in a direction parallel to the axis of the spindles, is determined by means of four screws, $58^a$. These screws are arranged in pairs at either end of the base 58, one screw of each pair extending through the base 58 into a tapped hole in the frame of the machine, the remaining screw of each pair extending only to the adjoining edge of the frame and engaging a tapped hole in the base 58. By proper manipulation of these screws the base 58 may be moved in a direction parallel to the axis of the spindles of the machine.

*The tap and its holding means.*—This is best shown in Figs. 21, 22, 24 and 25. The tap, which we have designated 88 in Fig. 21, is of the common, solid, fluted type and may be of any desired length. The tap longitudinally, slidably engages a block having a hexagonal periphery, the block being indicated at 89 in Fig. 21. Inwardly projecting lugs 90, shown in elevation in Fig. 22, coöperate with the flutes or grooves in the tap, the hexagonal periphery of the block engaging a corresponding recess in the tap sleeve or spindle 91. While this arrangement prevents rotation of the tap relative to the sleeve which carries it, it does not prevent relative longitudinal movement. This result is secured by the mechanism best shown in Figs. 24 and 25. A cylindrical collar 92 having a smooth exterior and a threaded interior portion, engages the exterior of the tap and abuts against the block 89. In order to secure a fine lengthwise adjustment of the tap, it is only necessary to rotate the collar 92, when the tap and collar are withdrawn sufficiently to permit of rotation of the collar. In order to yieldably hold the collar in the position shown in Fig. 24, we provide the spring-pressed balls 93, which are held in the nut 94.

*The tap operating means.*—The mechanism which causes the advancement and retraction of the tap is shown in Figs. 17 and 18. It will be noted that the tap sleeve 91 extends from end to end of the machine and is supported in the chuck sleeve 95 and in the gear 103. The chuck sleeve is integral with the head 41, and positively connected to the sliding sleeve 48, heretofore referred to, and rotates in bearings 96. This sleeve is positively rotated by the gear 97. To the rear end of the chuck sleeve 95 a disk 98 is secured and to this disk is secured the nut 99 by means of the yoke 100. The nut engages a threaded collar 101, which is keyed to an auxiliary chuck sleeve 102. The arrangement is such that relative rotation of the sleeves 95 and 102 causes a longitudinal movement of the sleeve 102. The sleeve 102 is splined to the gear 103, the gear being held in a fixed position with relation to its bearing 104. However, the sleeve 102 is, by means of the key 105 and the nut 106, fixedly secured to the sleeve 91. Gears 97 and 103 are engaged respectively by gears 107 and 108, best shown in Figs. 1, 4, 5, 7 and 8. The latter are each loosely mounted upon a transverse shaft 109, which is positively actuated through the miter gears 110 by the main shaft 38. Because of the different sizes of the gears 97 and 107, 103 and 108, it will be seen that the tap sleeve rotates at a higher rate of speed than the chuck sleeve, but that both rotate in the same direction. The result is that while the work is rotated, the tap is rotated in the same direction, but at a higher speed and that when the tap is stopped, the work is relatively oppositely rotated and, therefore, backed off, although its rotation in the same direction and at the same speed is continued. Thus the necessity for reversing the direction of rotation of any of the parts in order to back the work off the tap is obviated.

In order to operate the tap and chuck in proper timed relation we provide the clutch members best shown in Figs. 7 and 8. In those figures it will be seen that on the shaft 82, which carries the cam 81, are also carried two cams 111, 112, each of which controls the operation of a clutch for connecting the shaft 109 to the gears 108, 107, respectively. A bell crank, which is pivoted at 113 and is provided with arms 114 and 115, serves to actuate the clutch members to the extent of withdrawing the clutch pin 116 at the proper time. To the shaft 109 is keyed the disk 117, best shown in Figs. 7, 11 and 12, the disk being provided with a cam surface 118 and a notch 119. The point 120 of the pin 116, best shown in Figs. 13 and 14, is shaped to engage the notch 119, the pin being longitudinally slidable in a groove in the hub of the gears 107, 108. A notch 121 in the pin 116 is adapted to be engaged by the beveled point 122 on the end of the arm 115 and retract the pin, thereby stopping the rotation of the gear. This pin will be held in its retracted position so long as the end of the arm 114 remains in the low part of the cam member 111 or 112. Inasmuch as the two clutch members are duplicates, the description of one will suffice.

Figure 3:
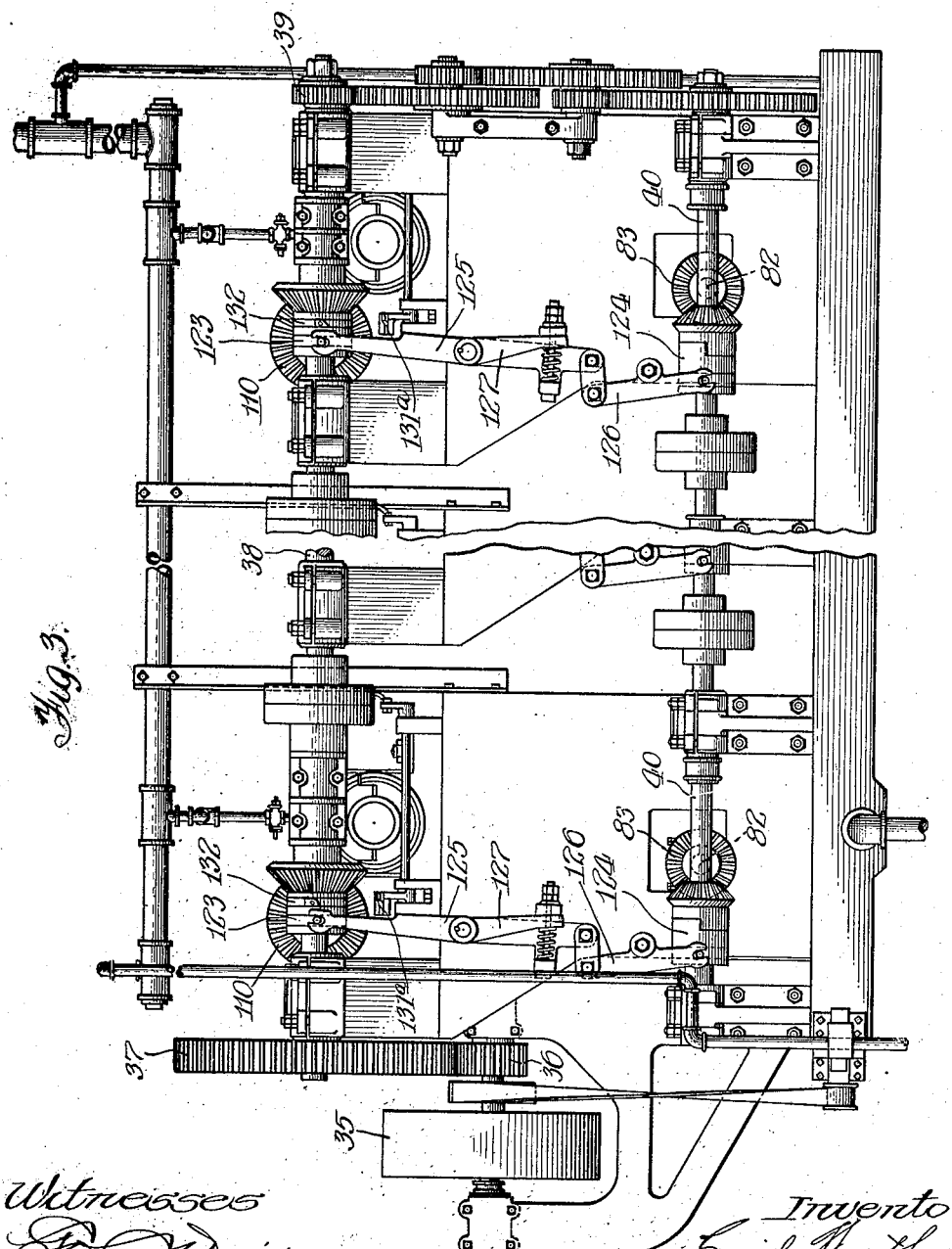
Fig. 3 is a rear elevation.

The gears just referred to are stopped and started in synchronous relation without attention from the operator, the arrangement of the cams being such that the tap is stopped before the work-holding chuck in order to permit the work to be backed off. However, as an emergency for disconnecting the shaft 109 and stopping the operation of the chuck and tap, we provide the clutches best shown in Figs. 3 and 6. These clutches serve to disconnect both the cam and drive shaft; that is, means for discontinuing the rotation of the shafts 82 and 109, the shafts 40 and 38 continuing to rotate. This means comprises the clutches 123, 124, which are actuated by the levers 125, 126, respectively, and both of which levers are simultaneously actuated by the lever 127, which may be manually moved by the hand lever 128. As this requires considerable manual exertion, we prefer to employ the means best shown in Fig. 6, comprising the operating handle 129, connecting rod 130 and lever 131, having the cam face or end 131$^a$. This cam face is adapted to engage with a cam 132, carried by the clutch 123, the arrangement being such that when the lever is thrown into the arc of rotation of the cam, both the clutches 123 and 124 are disengaged and remain in this position until manually engaged.

The operation of the machine is as follows: The machine being in motion, the operator places an unfinished union bottom, or such other piece as may be finished on the machine, between the chuck jaws and clamps the piece in position for finishing by pulling the lever 54 forward. This is done while the cams 111, 112, are in such position that the sleeves 91, 95, are stationary. At that time also the cam 81 will be in such position that the tool posts are separated fully. When the proper time arrives, both the tap spindle and the chuck spindle start rotating practically simultaneously, the ratios of the driving gears being such that the tap spindle rotates at substantially 150 revolutions per minute while the chuck spindle rotates at substantially 100 revolutions per minute— both in the same direction. The lead screw, which is lettered 101, revolves with the tap spindle, while the lead nut 99 revolves with the chuck spindle or sleeve. Their relative rotation causes the tap sleeve to advance axially, carrying the tap into engagement with the work. The tap cam is of such shape that when the tap has cut the required thread in the work the clutch which controls the rotation of the tap spindle is disengaged, the chuck spindle continuing its operation, with the result that while the tap spindle was rotating fifty revolutions per minute faster than the work, due to its stoppage, the work is now moving in a relatively reverse direction at 100 revolutions per minute. Thus the tap is entered slowly as required and retracted rapidly. At the proper time, subsequent to the stoppage of the tap spindle, the rotation of the chuck spindle is stopped. The operator then releases the finished article, as shown in Fig. 30, by pushing on the lever 54, and subsequently inserting a new piece of work, all within the time while the parts are idle and the tool posts retracted.

In the preferred arrangement where a plurality of units are connected in the same machine, the cams are set ninety degrees apart, assuming that four units are employed. Thus the cycle of work as outlined is completed on each unit one-fourth of a cycle in advance of the completion of the next succeeding cycle. This enables the operator to follow the work in proper succession.

Obviously the machine may be modified to operate upon other styles of work, and, therefore, that the new mechanism here disclosed and the new combination described must not be construed as adaptable only in connection with the finishing of union bottoms. As indicated in the appended claims, the invention is broader than if intended solely for the purpose herein described.

We claim:

1. In apparatus of the class described, the combination of a rotary spindle having blank clamping means on one end thereof, means for machining the exterior of an end portion of a blank held by said clamping means, a second rotatable spindle mounted within said first named spindle having a tap on one end, said tap being arranged to thread the interior of the blank clamped on said rotary spindle, and means for rotating said spindles at differential speeds to thereby simultaneously machine the exterior and tap the interior of said blank; substantially as described.

2. In apparatus of the class described, the combination of a rotary spindle having blank clamping means on one end thereof, means for machining the exterior of an end portion of a blank held by said clamping means, a second rotatable spindle mounted within said first named spindle having a tap on one end, said tap being arranged to thread the interior of the blank clamped on said rotary spindle, means for rotating said spindles at differential speeds to thereby simultaneously machine the exterior and tap the interior of said blank, and means for stopping rotation of one of said spindles to retract and thereby remove the tap from the threaded blank; substantially as described.

3. In apparatus of the class described, the combination of a rotary spindle having blank clamping means on one end thereof, means for machining the exterior of an end portion of a blank held by said clamping means, a second rotatable spindle mounted within said first named spindle having a tap on one end, said tap being arranged to thread the interior of the blank clamped on said rotary spindle, means for rotating said spindles at differential speeds to thereby simultaneously machine the exterior and tap the interior of said blank, and means for stopping rotation of the tap carrying spindle to thereby back off and remove the tap from the interior of the tapped blank; substantially as described.

4. In apparatus of the class described, the combination of a rotary spindle having blank clamping means on one end thereof, means for machining the exterior of an end portion of a blank held by said clamping means, a second rotatable spindle mounted within said first named spindle having a tap on one end, said tap being arranged to thread the interior of the blank clamped on said rotary spindle, means for rotating said spindles at differential speeds to thereby simultaneously machine the exterior and tap the interior of said blank, and means for stopping rotation of one spindle and thereby automatically remove the tap from the blank at the completion of the tapping operation; substantially as described.

5. In apparatus of the class described, the combination of a rotary spindle having blank clamping means on one end thereof, means for machining the exterior of an end portion of a blank held by said clamping means, a second rotatable spindle mounted within said first named spindle having a tap on one end, said tap being arranged to thread the interior of the blank clamped on said rotary spindle, means for rotating said spindles at differential speeds to thereby simultaneously machine the exterior and tap the interior of said blank, and means for advancing said machining means into operative engagement with said blank; substantially as described.

6. In apparatus of the class described, the combination of a rotary spindle having blank clamping means on one end thereof, means for machining the exterior of an end portion of a blank held by said clamping means, a second rotatable spindle mounted within said first named spindle having a tap on one end, said tap being arranged to thread the interior of a blank clamped on said rotary spindle, means for rotating said spindles at differential speeds to thereby simultaneously machine the exterior and tap the interior of said blank, and means for automatically moving said cutting means into and out of operative engagement with said blank; substantially as described.

7. In apparatus of the class described, the combination of a rotary spindle having blank clamping means on one end thereof, means for machining the exterior of an end portion of a blank held by said clamping means, a second rotatable spindle mounted within said first named spindle having a tap on one end, said tap being arranged to thread the interior of a blank clamped on said rotary spindle, means for rotating said spindles at differential speeds to thereby simultaneously machine the exterior and tap the interior of said blank, and means for automatically moving said tap and said cutting means into and out of operative engagement with said blank; substantially as described.

8. In a device of the class described, the combination of a manually operable work-holding clamp, a spindle upon which said clamp is mounted, a concentric hollow spindle mounted within said first-named spindle, a tap mounted within said last-named spindle, means for rotating said spindles in the same direction and at different speeds and means for causing relative axial movement of said spindles, substantially as described.

9. In a machine for finishing union bottoms, the combination of a pair of concentric hollow spindles, means for causing relative longitudinal movement of said spindles, a work-holding clamp carried by one spindle and a tap carried by the other spindle, means for rotating said spindles in the same direction and at different speeds and automatic means for sequentially stopping the rotation of said spindles, substantially as described.

Signed at Kewanee, Illinois, this 14th day of February, A. D. 1917.

EMIL WIRTH.
CHARLES A. DEMMLER.

Witnesses:
ALFRED A. HARRISON,
FRED J. TALBOTT.